United States Patent [19]
Robinson

[11] 4,417,772
[45] Nov. 29, 1983

[54] METHOD AND APPARATUS FOR CONTROLLING THE ENERGIZATION OF THE ELECTRICAL COILS WHICH CONTROL A MAGNETIC BEARING

[75] Inventor: Alan A. Robinson, Wassenaar, Netherlands

[73] Assignee: Agence Spatiale Europeenne, Paris, France

[21] Appl. No.: 252,849

[22] Filed: Apr. 10, 1981

[51] Int. Cl.³ .............................................. F16C 39/06
[52] U.S. Cl. ..................................................... 308/10
[58] Field of Search .......................... 308/10; 323/243

[56] References Cited

U.S. PATENT DOCUMENTS

| Re. 27,660 | 6/1973 | Atkinson | 308/10 |
| 3,650,581 | 3/1972 | Boden et al. | 308/10 |
| 3,697,143 | 10/1972 | Kinchuch | 308/10 |
| 3,785,709 | 1/1974 | Atkinson | 308/10 |
| 3,902,374 | 9/1975 | Hoffman et al. | 308/10 |
| 3,955,426 | 5/1976 | Klinchuch | 308/10 |
| 4,088,379 | 5/1978 | Perper | 308/10 |
| 4,160,202 | 7/1979 | James et al. | 323/243 |
| 4,285,553 | 5/1979 | Robinson | 308/10 |

*Primary Examiner*—R. Skudy
*Attorney, Agent, or Firm*—Fred A. Keire

[57] ABSTRACT

This invention applies to a magnetic bearing comprising stator and rotor members positioned coaxially with each other in the same plane with an annular gap therebetween, and electrical coils located in pairs on each axis in the plane. According to the invention, the control of the energization of the coils is performed by detecting, for each axis, the relative position error between the stator and the rotor members of the magnetic bearing from a reference position and generating a first or a second control signal depending on whether the position error is positive or negative. The first control signal is applied to a first electronic circuit including the electrical coil at one end of said axis and the second control signal is applied to a second electronic circuit including the electrical coil at the other end of the axis. In this way, only that coil is energized which is located where the gap between the stator and rotor members is smaller, whereby the magnetic flux there is reduced.

5 Claims, 4 Drawing Figures

METHOD AND APPARATUS FOR CONTROLLING THE ENERGIZATION OF THE ELECTRICAL COILS WHICH CONTROL A MAGNETIC BEARING

BACKGROUND OF THE INVENTION

The present invention relates generally to magnetic bearings and more particularly to a new method and an electronic circuit for controlling the energization of the different electrical coils which govern the generation of a magnetic field capable of varying the total magnetic flux in the magnetic bearing.

A particular type of magnetic bearing which the invention is concerned with is a device comprising a stator and a rotor member positioned coaxially with each other in the same plane without mechanical contact therebetween. The stator member or the rotor member include a permanent magnet the magnetic flux of which ensures the axial alignment of the rotor member relative to the stator member. Also the stator includes four segmental electrical coils, two of said coils being centered on each coordinate axis in the common plane of the stator and rotor members. These segmental coils are effective, in a manner known per se, to generate in the annular gap between the stator and rotor members, magnetic fields which serve to control the radial position of the rotor member relative to the stator member along the two coordinate axes in their common plane.

For that purpose, the opposed coils which control the radial position along either axis are usually connected in series or in parallel arrangement in a control loop. When the rotor is moved away from its radial position centered on the X-axis for instance, the deviation signal is electronically processed so as to cause a current to flow in the two coils associated to said X-axis, the current flowing in the positive or negative direction depending on the polarity of the deviation signal. The resulting magnetic fields thus produced by the coils are such that the permanent magnetic flux is strengthened in the larger gap and weakened in the smaller gap. The rotor thus experiences a higher attraction force on the coil side where the gap is larger than on the opposed coil and is thus restored to a position of concentricity.

When considered for space applications the aforedescribed device is characterized by the following disadvantageous features:

(a) the amplifiers driving the coils must be capable of supplying bi-directional currents and this requires the availability of a symmetrical voltage power source which usually is not available on satellites, or an amplifier with a bridge-type output stage which results in relatively complex circuitry;

(b) the amplifiers used are linear amplifiers which dissipate substantial power, typically in the order of several tens of watts in their output stages;

(c) all coils on a given control axis are energized simultaneously, which results in a waste of power in the coils under conditions of high rotor eccentricity, e.g. during lift-off.

SUMMARY OF THE INVENTION

This invention has as first object a method for controlling the energization of the coils associated with a magnetic bearing with substantially reduced power consumption.

Another object of the invention is a control circuit for said coils which is simple to construct.

In accordance with the invention, for each axis a position error signal is generated representing the relative position deviation between the stator and rotor members from a reference position. Depending on whether the position error signal is positive or negative a first or a second control signal is generated, said first control signal being applied to a first electronic circuit including the electrical coil at one end of the axis and said second control signal being applied to a second electronic circuit including the electrical coil at the other end of the axis, thereby to only energize that coil which is located where the gap between the stator and rotor members is smaller in order to reduce the magnetic flux there.

DESCRIPTION OF AN EXEMPLARY EMBODIMENT

The principle on which this invention is based consists in energizing for each axis only that electrical coil which is located near the point where the gap between the stator and rotor members is smaller. Experiments have shown that it is that very electrical coil which is effective to produce the greatest correction force.

Figure 1:
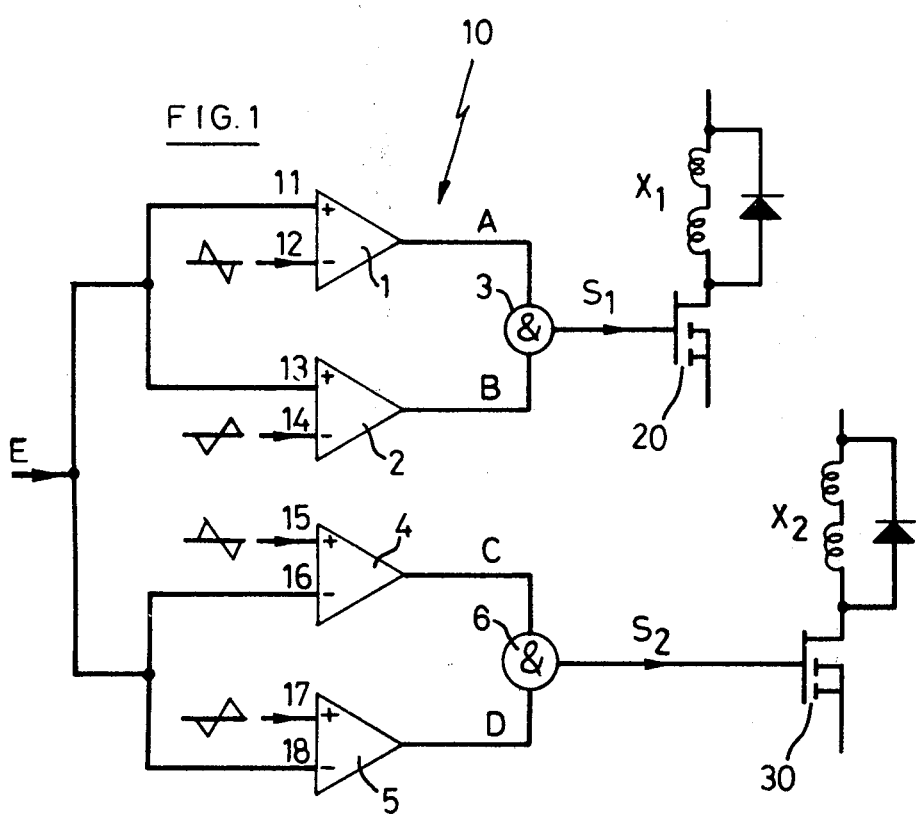
FIG. 1 is a schematic diagram of the control circuit according to the invention.

Referring to FIG. 1, the numerals $X_1$ and $X_2$ denote the two electrical coils which control the radial position of the rotor member of a magnetic bearing (not shown) relative to the stator member thereof along an axis. The input signal E is the rotor position error signal, a signal which is generated in a manner known per se from capacitive or inductive sensors located at different places within the housing of the magnetic bearing through , known PID (proportional, integral, differential) regulator followed on by a pre-amplifier. The error signal E has a first state (e.g. a positive polarity) for a position error in one sense and a second state (e.g. a negative polarity) for a position error in opposite sense.

Figure 2:
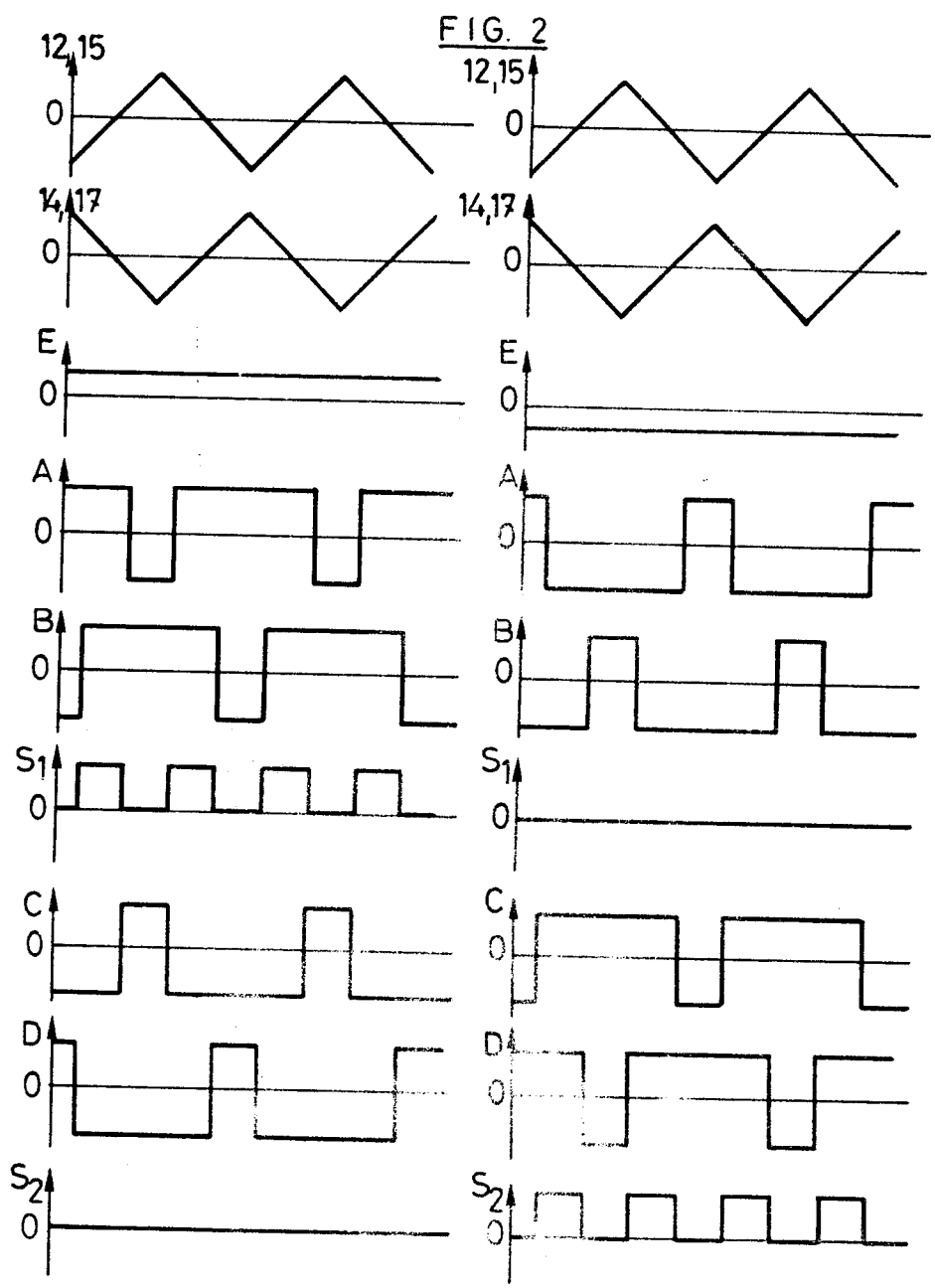
FIG. 2 depicts typical signal waveforms in the circuitry of FIG. 1.
Figure 3:
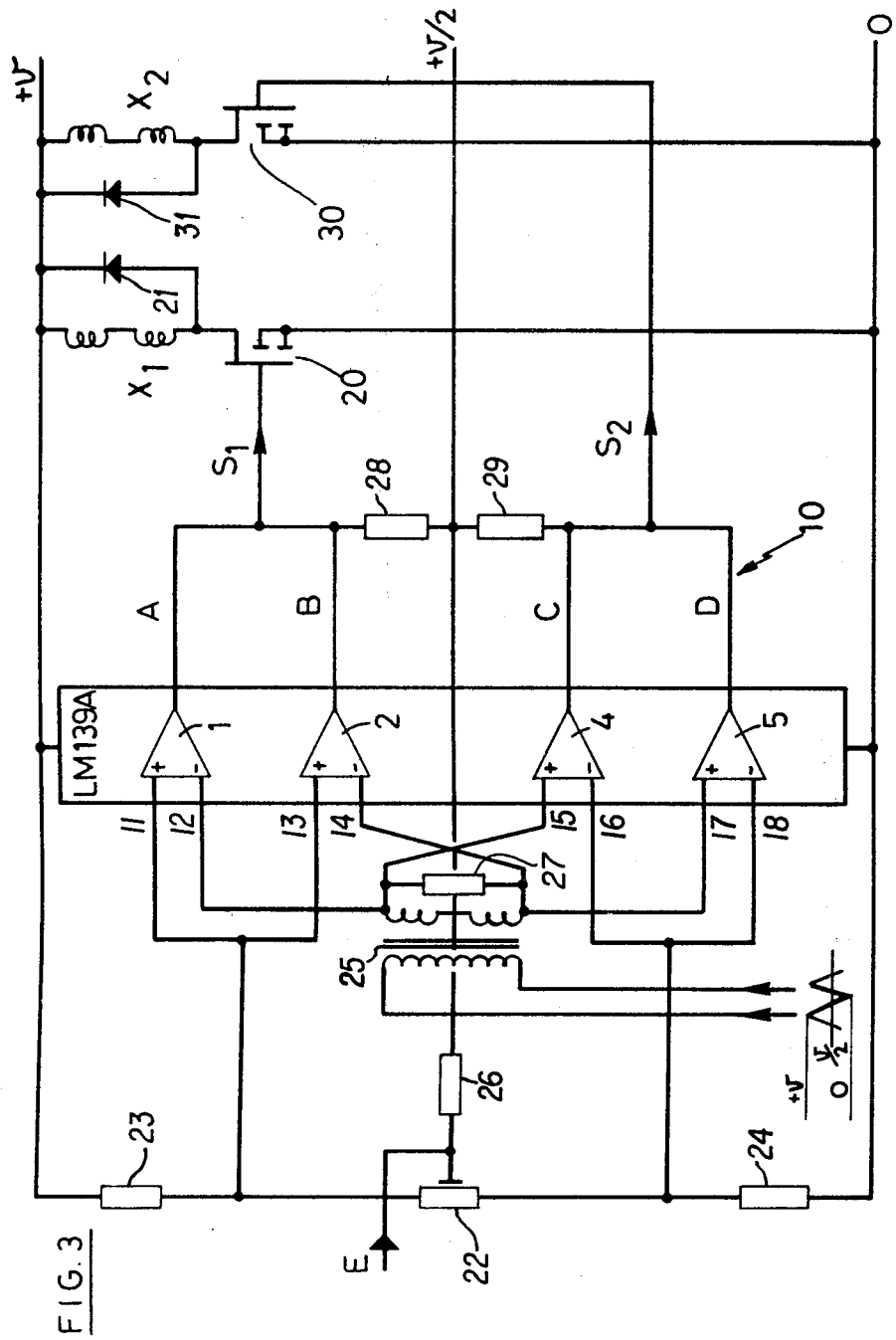
FIG. 3 is a more detailed schematic diagram of the circuit of FIG. 1.
Figure 4:
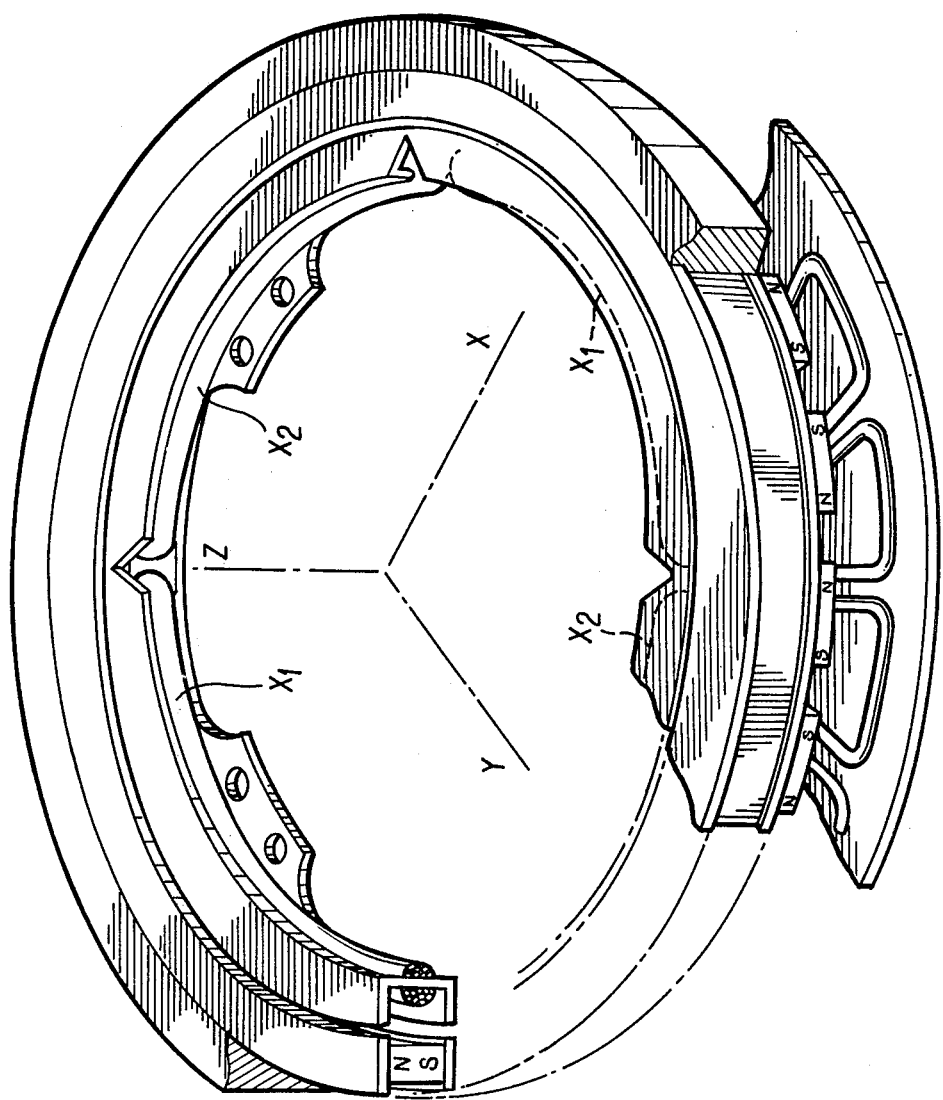
FIG. 4 is a perspective of one type of magnetic bearing, described in detail in copending application Ser. No. 35,409, now U.S. Pat. No. 4,285,553, with which the present invention finds ready application.

In accordance with the invention, the position error signal E is applied to a control circuit comprising a modulator 10 which drives two switching devices 20, 30. Each of these switching devices is connected in a respective electronic circuit including an electrical coil: the switching device 20 delivers current into coil $X_1$ and the switching device 30 delivers current into coil $X_2$. The switching devices 20 and 30 are advantageously VMOS transistors (vertical metal-oxide semiconductor transistors). The modulator 10 comprises essentially four comparators 1,2,4,5 and two AND-gates 3,6. The comparators are advantageously included in a single integrated circuit. The position error signal E is applied to the positive inputs 11, 13 of comparators 1 and 2 and to the negative inputs 16, 18 of comparators 4 and 5. The other inputs 12, 14, 15, 17 of the comparators accept positive and negative triangular wave signals, as shown in FIGS. 1 and 2. The comparators 1 and 2 produce output signals A and B which are combined in the AND-gate 3 for producing a first pulse train S1 in response to the input signal E being positive. The comparators 4 and 5 produce output signals C and D which are combined in the AND-gate 6 for producing a second pulse train S2 in response to the error signal E being negative. The width of the pulses S1 and S2 is proportional to the amplitude of the error signal E, that is to the position deviation of the rotor member relative to its centered position with respect to the stator member. FIG. 2 depicts the signal waveforms for a positive error signal E (left hand column) and for a negative error signal E (right hand column). FIG. 3 is a more detailed schematic diagram of the circuit of FIG. 1.

The control pulses S1 and S2 are applied to the base electrode of transistors 20 and 30 respectively. One coil only is thereby energized at any time depending on the polarity of the input error signal E, i.e. depending on the sense of the position deviation of the rotor member along the axis considered.

FIG. 3 schematically illustrates an illustrative embodiment of the control circuit wherein error signal E is applied through a potentiometer 22 to the positive inputs 11, 13 of the comparators 1 and 2 and to the negative inputs 16, 18 of the comparators 4 and 5. The remaining inputs 12, 14, 15, 17 to said comparators are supplied with positive and negative triangular wave signals through a phase-splitting transformer 25 whose opposite ends are connected to the inputs 12, 14 of comparators 1 and 2, respectively, and to the inputs 15, 17 of comparators 4 and 5, respectively.

Potentiometer 22 and resistors 23 and 24 are biasing resistors which serve to eliminate any "dead zone" effect exhibited by the comparators 1, 2, 4 and 5 due to their inherent offset voltages. Resistor 26 is a decoupling resistor, and resistor 27 is a matching resistor which provides correct loading of transformer 25.

The signals A and B from the comparators 1 and 2 are combined in a logical AND manner by resistor 28 to produce the first train of pulses $S_1$ when the error signal E is positive. The signals C and D from the comparators 4 and 5 are combined in a logical AND manner by resistor 29 to produce the second train of pulses $S_2$ when the error signal E is negative.

Pulses $S_1$ and $S_2$, which do not appear simultaneously, are applied to the gate electrodes of the VMOS transistors 20 and 30 respectively which energize the coils $X_1$ or $X_2$ for producing position control fluxes in response to the error signal E. Free wheeling diodes 21 and 31 serve to smooth the current in coil $X_1$ or coil $X_2$, respectively, with mean level proportional to the amplitude of the error signal E.

A characteristic feature of the system is that only one coil on each axis is energized at any time, which allows the coil connections to be so chosen that a single voltage supply (e.g. +28 V) may be used without complex circuitry being involved. Furthermore, the efficiency of the system in terms of force per watt is higher than in the prior art systems because only the more effective coils are used. In addition, the control circuit of the invention operates in the switching mode, whereby the power dissipated in the switching transistors is at a minimum (typically several tens of watts only).

Also, the electronic circuitry is of extreme simplicity in terms of number of components used and reliability is thus enhanced.

What is claimed is:

1. A method of controlling the energization of electrical coils which control a magnetic bearing of the type having stator and rotor members disposed coaxially with each other in the same plane with an annular gap between them, said electrical coils being located in pairs on each axis in said plane, one coil in each pair being located on the magnetic bearing at one end of said axis and the other coil at the other end of said axis, and wherein the relative positions between the stator and rotor members along the axis are detected and a position error signal representing the position deviation relative to a reference position is detected, the method comprising the improvement of generating a first control signal in response to the position error signal being positive and a second mutually exclusive control signal in response to the position error signal being negative; and applying said first control signal to a first electronic switching circuit coupled to the electrical coil located at one end of said axis and applying said second control signal to a second electronic switching circuit coupled to the electrical coil located at the other end of said axis, whereby only that coil is energized which is located near the point where the gap is smaller, thereby to reduce the magnetic flux there and restore the centered position.

2. A control circuit for controlling the energization of at least a pair of coils which generate a magnetic flux for a magnetic bearing of the type in which stator and rotor members are disposed coaxially having an annular gap between them, said pairs of coils being oppositely disposed from each other and symmetrically positioned with respect to said rotor member, said coils being selectively energizable to alter the magnetic flux of said magnetic bearing and thereby alter the position of said rotor member with respect to said stator member, said control circuit comprising position error signal means for providing a position error signal whose magnitude represents the displacement error of said rotor member relative to the axis of the stator member and whose polarity represents the direction of said displacement error, whereby a positive position error signal is indicative of a displacement of the rotor member toward one of said coils in said pair and a negative position error signal is indicative of a displacement of the rotor member toward the other of said coils in said pair; triangular wave signal means for supplying triangular wave signals; comparator means coupled to receive said position error signal and said triangular wave signals for producing a first pulse train when said position error signal is positive and a second pulse train when said position error signal is negative, the width of the pulses produced by said comparator means being a function of the magnitude of said position error signal relative to said triangular wave signal; first switching means responsive to aid first pulse train to supply current pulses to only one of the coils in said pair for energizing said one coil to alter the magnetic flux of said magnetic bearing and thereby restore the rotor member to its coaxial disposition so as to minimize said position error signal; and second switching means responsive to said second pulse train to supply current pulses to only the other of the coils in said pair for energizing said other coil to alter the magnetic flux of said magnetic bearing and thereby restore the rotor member to its coaxial disposition so as to minimize said position error signal.

3. A control circuit according to claim 2, wherein the comparator means comprises two pairs of comparators in a single integrated circuit, one pair being responsive to positive position error signals and the other pair being responsive to negative position error signals, and a pair of AND-gates combining the outputs from each pair of comparators, respectively.

4. A control circuit according to claim 3 wherein each comparator includes negative and positive inputs and is operative to produce a positive output for so long as the signal supplied to the positive input thereof exceeds the signal supplied to the negative input thereof; wherein the position error signal is supplied to the positive input of each comparator in said one pair and oppositely-phased triangular wave signals are supplied to the negative input of each comparator in said one pair; and wherein the position error signal is supplied to the negative input of each comparator in said other pair and oppositely-phased triangular wave signals are supplied to the positive input of each comparator in said other pair.

5. A control circuit according to claim 2, wherein the first and second switching means are VMOS transistors.

* * * * *